United States Patent Office 3,265,783
Patented August 9, 1966

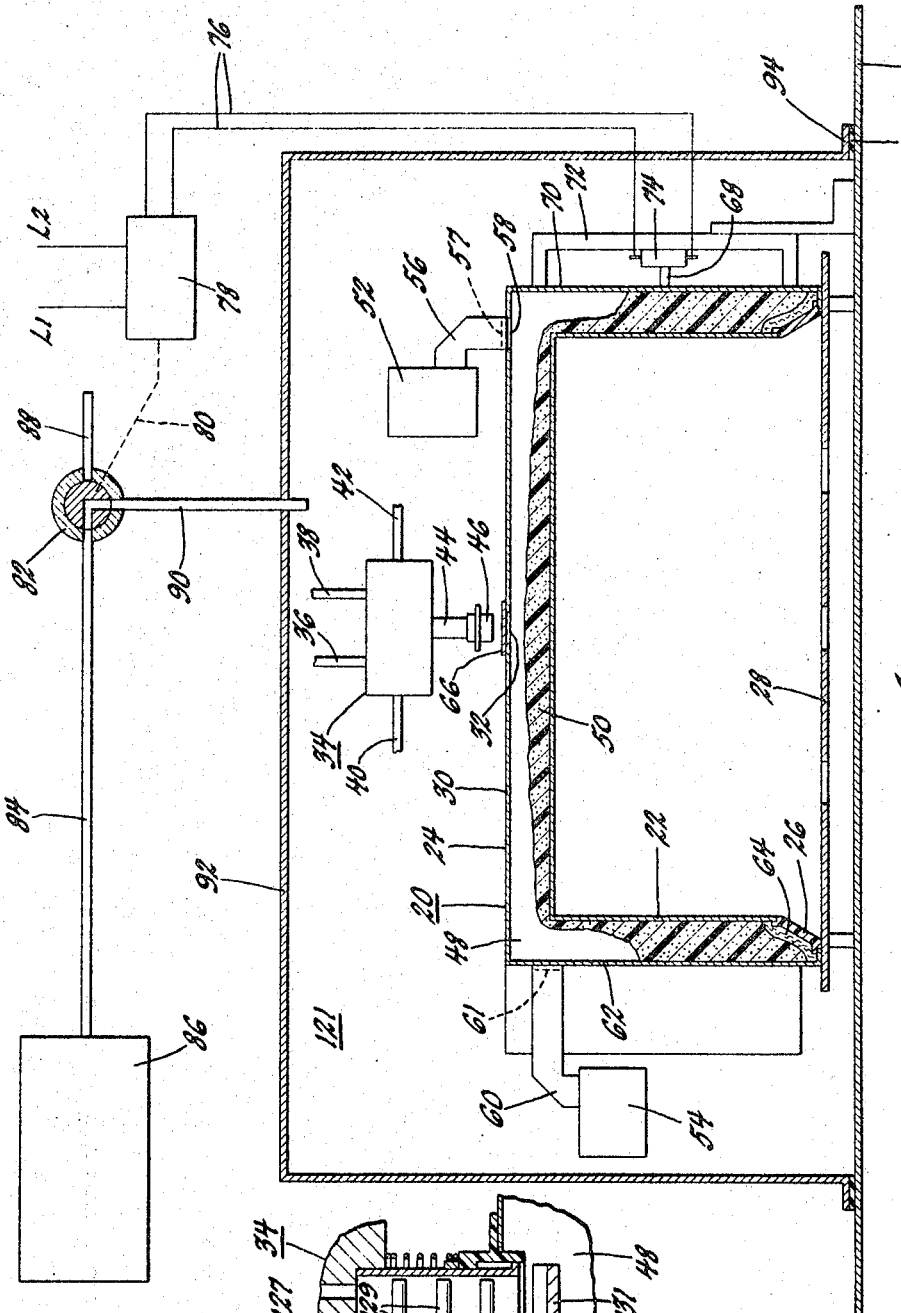

3,265,783
METHOD INCLUDING THE PREVENTING OF BULGING OF THE WALLS ENCLOSING A SPACE DURING THE MOLDING INSITU OF FOAMABLE PLASTIC MATERIALS
James W. Jacobs, Dayton, Ohio, assignor to General Motors Corporation, Detroit, Mich., a corporation of Delaware
Filed Apr. 2, 1963, Ser. No. 269,976
2 Claims. (Cl. 264—45)

This invention pertains to a method of manufacture and more particularly to a method of using means for preventing bulging of the walls of a space to be filled with foam material.

It has been recognized that lightweight foam materials are excellent for filling spaces in walls. When they contain an insulating gas, it has been recognized that they have excellent insulating properties. The most economical construction is obtained when the foam-forming material is cast between thin sheet metal walls. It has been found that these materials, as the foaming takes place, exert sufficiently high pressure upon the thin walls to cause them to bulge. It has been customary to prevent such bulging by the use of thick molds. This considerably increases the cost of manufacture and has limited the use of foam material in many possible applications.

It has also been proposed that the forming be stimulated and made more uniform by the application of microwave energy to the space to be filled. This provides more rapid foaming. The use of the microwave energy, however, reduces but does not eliminate the high expansion pressures and the necessity for the thick molds.

It is an object of this invention to counteract the expansion force of the foam-forming materials upon the walls sufficiently to prevent the bulging of the walls.

It is another object of this invention to provide an inwardly directed pressure on the spaced walls substantially equal to the outward expansion pressure of the foam-forming materials.

It is another object of this invention to apply onto the outer face of said walls a fluid whose pressure is increased as the tendency increases for the walls to bulge outwardly.

These and other objects are attained in the form illustrated in the drawings in which a sheet metal refrigerator cabinet having inner and outer sheet metal walls is placed within a pressure chamber. Foam-forming insulation materials are introduced through a central opening in the back wall into the insulation space. Preferably, immediately prior to and during the introduction of the foam-forming materials and during the expansion and curing of the foam-forming materials in the insulation space, there is discharged into the insulation space microwave energy from one or more microwave generators. The microwave energy speeds and makes more uniform the reaction of the foam-forming materials to provide a lighter density, more uniform, cellular structure having a greater insulating property. The reaction of the foam-forming materials within the insulation space causes it to exert pressures against the inner faces of the sheet metal inner and outer walls which must be resisted to prevent bulging. According to my invention, the entire apparatus is enclosed within a substantially airtight enclosure. A sensor responsive to the bulging of one of the walls controls a supply of air under pressure to the enclosure as the tendency for the walls to bulge increases. This provides an external pressure substantially equal to and opposite the internal pressure provided by the foam-forming materials to substantially prevent the bulging of the walls.

Further objects and advantages of the present invention will be apparent from the following description, reference being had to the accompanying drawings wherein a preferred embodiment of the present invention is clearly shown.

In the drawings:

FIGURE 1 is a transverse vertical sectional view, partly diagrammatic, of a refrigerator cabinet and apparatus for carrying out my improved foaming process; and FIGURE 2 is a fragmentary view showing a foam flinger which may be used in connection with the introduction of the foam in FIGURE 1.

Referring now to the drawings and more particularly to FIGURE 1, there is shown a refrigerator cabinet 20 provided with thin sheet metal inner walls 22 and thin sheet metal outer walls 24 which are joined by a breaker strip 26 of a suitable plastic material adjacent the door opening or open side of the cabinet. The cabinet is placed with its open side facing downwardly and resting upon the perforated elevated platform 28. The rear wall 30 of the cabinet 20 is provided with a substantially centrally located opening 32 for the introduction of the foam-forming material. For this purpose, there is provided a foam-mixing apparatus 34 having supply conduits 36 and 38 for the two components and return conduits 40 and 42 for returning the components in a circulating system. The mixing apparatus is provided with suitable valves and controls for discharging in the proper proportions the two components into a mixing chamber 44 having its outlet 46 provided with a motor-driven flinger 131 (see FIGURE 2) which, when introduced into the insulation space 48 between the inner and outer shells, centrifugally distributes the foam-forming material, designated by the reference character 50, to all parts of the insulation space.

To speed and make more uniform the reaction of the foam-forming materials and the production of uniform, lightweight, cellular structure, I introduce microwave energy, preferably between $10^7$ to $10^{13}$. As shown in FIGURE 1, two microwave generators 52 and 54 are provided. The one microwave generator 52 discharges through a wave guide 56, a plastic window 57 and an aperture 58 in one corner of the rear wall 30 downwardly so that the microwaves are particularly directed to the insulation space between the vertical wall portions of the cabinet. The microwave generator 54 discharges the microwaves through the wave guide 60, a plastic window 61 and an aperture in the bottom wall 62 in a horizontal direction substantially in alignment with the insulation space between the inner and outer rear walls of the cabinet. This arrangement assures the direction of the microwaves throughout the rear wall insulation space as well as to the bottom wall insulation space so that the entire insulation space 48 is substantially uniformly penetrated by the microwaves. The foam-forming material 50 first covers a layer of glass fibers 64 provided on the inner face of the breaker strip 26 and then subsequently fills the vertically positioned insulation spaces and finally the horizontally positioned insulation space between the inner and outer rear walls. After sufficient foam-forming material is introduced, the opening 32 is preferably closed by a metal cover 66.

The reaction of the foam-forming materials assisted by the microwave energy applied to the foam-forming materials causes pressure within the insulation space 48 to be exerted by the material against the inner faces of the inner and outer walls 22 and 24. According to my invention, to prevent bulging of these walls, I provide a sensor 68 which is held against the central portion of the top wall 70 by a U-shaped support 72 which has its legs extending in contact with edge portions of the top wall 70. Through a suitable switch or transducer 74, the sensor 68 controls the supply of electrical energy through the conductors 76 which connect to a control device 78 which is supplied with electric energy from the supply conductor $L_1$ and $L_2$. The electrical control device 78 through the operative connection 80 operates a two-way valve 82. The two-way valve 82 is connected by a pipe 84 to a supply of air 86 under pressure. The two-way valve 82 has one exhaust pipe 88 discharging into the atmosphere and a third pipe 90 extending into the enclosure 92 which is in the form of a box having its bottom, open side provided with flanges 94 having a gasket seal 96 resting upon the floor 98. This enclosure 92 may be made of metal or any other suitable material and extends completely around the cabinet 20 and the foam supplying apparatus as well as the microwave apparatus. Any slight tendency of the top wall 70 to bulge will be instantly detected by the sensor 68 which will control the electrical operating means 78 to control the two-way valve 82 in such a way as to supply, from the air pressure supply 86 through the pipes 84 and 90 to the interior of the enclosure 92, sufficient air to raise the pressure within the space 121 high enough to prevent any further bulging of the walls and to create a pressure within the enclosure 121 which is substantially equal to the pressure within the insulation space 48 within the refrigerator cabinet 20. This externally applied pressure makes unnecessary the use of inner and outside molds for preventing the bulging of the walls of the refrigerator cabinet 20 during the foaming of the insulation material.

As one specific example of the foam-forming material suitable for the introduction into the insulation space 48 accompanied by microwave energy from the generators 52 and 54, I select for the A component, 100 parts by weight of a prepolymer made from 79 parts by weight of a polydiisocyanate mixture comprising 80 parts by weight of 2,4 toluenediisocyanate and 20 parts by weight of 2,6 toluenediisocyanate together with 21 parts by weight of a polyether A as defined hereinafter. The A component is continuously circulated through the conduit 36, the mixer 34 and the return conduit 40. The B component circulates independently through the mixer 34 from the conduit 38 to the conduit 42. The B component is composed of 87 parts by weight of the same polyether A as defined hereinafter to 3 parts by weight of an activator consisting of 2 parts by weight of tetramethylbutanediamine and 1 part by weight of an organo silicon surfactant and 38 parts by weight of trichloromonofluoromethane.

There materials through suitable dual valving arrangements in the valve chamber of the mixer 34 are separately introduced into the mixing chamber 44 in the proportion of 100 parts by weight of the A or prepolymer component to 128 parts by weight of the B or polyether component. The polyether A is made up of sucrose 1 part, propylene oxide 11 parts, ethylene oxide 4 parts, and has an OH number of 445 to 470, a viscosity in centipoises at 25° C. of 22,000 to 32,000. The water by weight is a maximum of .15% and the pH of the polyether A is between 3.5 and 5. All quantities of the ingredients of polyether A are mentioned in mols unless otherwise noted. The microwave energy from the microwave generators 52 and 54 may introduce microwaves at 2450 megacycles frequency into the insulation space 48.

Other foam-forming materials may be introduced into the insulation space 48 as a substitute for the foregoing polyurethane example and similarly treated with microwave energy. Examples of other foam-forming materials which may be advantageously used include unsaturated polyester resin provided with a fluorohydrocarbon surfactant and catalyst; vinyl foam-forming materials, such as polyvinylchloride resin with a blowing agent, stabilizer and plasticizer; and epoxy resin foam-forming materials, such as are disclosed in United States Patent 3,051,661, issued August 28, 1962. Microwave generators having a different frequency and a different available intensity may also be used for different periods of time to obtain the exact expansion desired.

The outlet 46 may be slidably mounted upon the sleeve 123 which encloses the mixing chamber 44. The spring 125 is provided for normally holding the outlet 46 against the outer flange upon the sleeve 123. Within the mixing chamber 44, there extends a mixer shaft 127 provided with a plurality of mixing pins 129. The mixer shaft 127 is connected at its upper end to a driving motor which, during the operation of the apparatus, rotates the mixer shaft 127 at a relatively high speed. At the bottom of the mixer shaft 127, there is provided a centrifugal flinger 131 having straight blades 133 which fling the foam centrifugally as it emerges from the mixing chamber 44 so as to insure good distribution of the foam to all parts of the insulation space. When the outlet 46 is pressed against the edges of the opening it is retracted against the force of the spring 125 so that the flinger 131 is exposed within the insulation space 48 as shown in FIGURE 2.

By providing a substantially equal and opposite pressure upon the outer faces of the walls, bulging of the walls is substantially prevented.

While the embodiment of the present invention, as herein disclosed, constitutes a preferred form, it is to be understood that other forms might be adopted.

What is claimed is as follows:

1. The method of filling with a foam a structure having spaced flexible but non-extendible, substantially impervious sheet walls, providing a space therebetween, and capable of bulging outwardly when a pressure is exerted on their interior surfaces, comprising:
    (a) placing said structure within a substantially fluid-tight chamber, in which a fluid, when introduced into said chamber contacts the outer surface of each of said walls,
    (b) inserting into said space, foam-forming material,
    (c) forming within said space a foam which, during its formation expands and exerts a varying outward pressure on said walls, having a tendency to cause bulging outwardly of said walls,
    (d) during the formation of the foam, contacting the exterior surface of each of said spaced walls with a fluid which has been introduced into said fluid-tight chamber prior to the formation of said foam, and
    (e) varying the pressure of said fluid to exert on the exterior of each of said walls an inwardly directed pressure substantially equal and opposite to that outward expansion pressure exerted by said foam during its formation, thereby preventing bulging of said walls.

2. The method of claim 1 in which the walls are sheet metal.

References Cited by the Examiner

UNITED STATES PATENTS

| 2,552,641 | 5/1951 | Morrison | 264—45 X |
| 2,907,074 | 10/1959 | Rhodes | 264—45 |
| 3,088,172 | 5/1963 | Weinbrenner et al. | 264—45 X |
| 3,091,205 | 5/1963 | Watson | 264—45 X |
| 3,208,103 | 9/1965 | Voelker | 264—47 X |

FOREIGN PATENTS

| 656,199 | 1/1963 | Canada. |
| 1,262,090 | 4/1961 | France. |

ALEXANDER H. BRODMERKEL, *Primary Examiner.*

P. E. ANDERSON, *Assistant Examiner.*